United States Patent
Kobayashi et al.

(10) Patent No.: US 11,962,052 B2
(45) Date of Patent: Apr. 16, 2024

(54) FUEL CELL MODULE AND POWER GENERATION SYSTEM

(71) Applicant: Mitsubishi Power, Ltd., Yokohama (JP)

(72) Inventors: Daigo Kobayashi, Yokohama (JP); Hiroyuki Ozawa, Yokohama (JP); Masahiro Mihara, Yokohama (JP); Ryutaro Mori, Tokyo (JP); Takeshi Matsuo, Tokyo (JP); Norihisa Matake, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 475 days.

(21) Appl. No.: 17/430,851

(22) PCT Filed: Feb. 14, 2020

(86) PCT No.: PCT/JP2020/005756
§ 371 (c)(1),
(2) Date: Aug. 13, 2021

(87) PCT Pub. No.: WO2020/175181
PCT Pub. Date: Sep. 3, 2020

(65) Prior Publication Data
US 2022/0131174 A1     Apr. 28, 2022

(30) Foreign Application Priority Data
Feb. 25, 2019     (JP) ................. 2019-032120

(51) Int. Cl.
*H01M 8/2475*     (2016.01)
*H01M 8/04007*     (2016.01)
(Continued)

(52) U.S. Cl.
CPC ..... *H01M 8/2475* (2013.01); *H01M 8/04067* (2013.01); *H01M 8/04111* (2013.01); *H01M 8/04201* (2013.01)

(58) Field of Classification Search
CPC ......... H01M 8/04067; H01M 8/04111; H01M 8/04201; H01M 8/0444; H01M 8/0662;
(Continued)

(56) References Cited

U.S. PATENT DOCUMENTS

2016/0133955 A1*   5/2016  Ozawa ................. H01M 8/249
                                                               429/439

FOREIGN PATENT DOCUMENTS

JP    2009-110970    5/2009
JP    2011-204600   10/2011
(Continued)

OTHER PUBLICATIONS

International Search Report dated May 19, 2020 in International (PCT) Application No. PCT/JP2020/005756.
(Continued)

*Primary Examiner* — Matthew W Van Oudenaren
(74) *Attorney, Agent, or Firm* — Wenderoth, Lind & Ponack, L.L.P.

(57) ABSTRACT

A fuel cell module comprises: at least one cell stack including a plurality of single fuel cells supplied with a fuel gas and an oxidizing gas to generate power; a sealable housing accommodating the at least one cell stack and forming a power generation chamber inside the housing; a pressure vessel accommodating the housing; and an oxidizing gas supply pipe for supplying the oxidizing gas to the cell stack. At least one pressure equalizing opening is formed in the housing to allow communication between inside and outside of the housing. The at least one pressure equalizing opening includes only one pressure equalizing opening, or a plurality of pressure equalizing openings in which a distance between a pressure equalizing opening in the highest position and a pressure equalizing opening in the lowest position is within 0.1H, where H is a height of the housing.

18 Claims, 6 Drawing Sheets

(51) Int. Cl.
*H01M 8/04082* (2016.01)
*H01M 8/04111* (2016.01)

(58) Field of Classification Search
CPC ......... H01M 8/04089; H01M 8/04097; H01M
8/04104; H01M 8/04432; H01M 8/0438;
H01M 8/04425; H01M 8/04746; H01M
8/04776; H01M 8/04783; H01M
2008/1293
See application file for complete search history.

(56) References Cited

FOREIGN PATENT DOCUMENTS

| | | |
|---|---|---|
| JP | 2013-33592 | 2/2013 |
| JP | 2013-069433 | 4/2013 |
| JP | 2016-091968 | 5/2016 |
| JP | 2018-139193 | 9/2018 |

OTHER PUBLICATIONS

Office Action dated Sep. 20, 2023 in corresponding Korean Patent Application No. 10-2021-7025769, with English machine translation.

* cited by examiner

FUEL CELL MODULE AND POWER GENERATION SYSTEM

TECHNICAL FIELD

The present disclosure relates to a fuel cell module and a power generation system.

BACKGROUND

As the next generation energy, fuel cells are known to generate power through chemical reaction between a fuel gas supplied to a fuel side electrode and an oxidizing gas supplied to an oxygen side electrode, with a single fuel cell composed of the fuel side electrode, electrolyte, and oxygen side electrode as the smallest unit.

Of these, a solid oxide fuel cell (SOFC) uses ceramic such as zirconia ceramic as the electrolyte and operates by fuel such as city gas, natural gas, petroleum, methanol, or coal gasification gas. Such a SOFC is known as a highly efficient high temperature fuel cell with a wide range of applications because of a high operating temperature of about 700 to 1000° C. to increase ionic conductivity. The SOFC can be combined with a rotating device such as a gas turbine, a micro gas turbine, or a turbocharger, for example, to increase the operating pressure for more efficient power generation. In this pressurized power generation system, compressed air discharged from a compressor is supplied to the oxygen side electrode of the SOFC as the oxidizing gas, and hot exhaust fuel gas discharged from the SOFC is supplied to a combustor at the inlet of the rotating device such as a gas turbine for combustion of the fuel gas. The hot combustion gas generated in the combustor is used to rotate the rotating device so as to recover the power.

A fuel cell module is configured to form a cell stack with a plurality of single fuel cells, and to form a power generation chamber with a plurality of cell stacks accommodated in a casing, for example. The single fuel cell has a fuel gas passage and an oxidizing gas passage. The fuel gas passage is supplied with a fuel gas through a fuel gas supply pipe, and the oxidizing gas passage is supplied with an oxidizing gas (e.g., air) through an oxidizing gas supply pipe.

Patent Documents 1 and 2 disclose a pressurized system in which a casing accommodating cell stacks is accommodated in a pressure vessel, and pressurized fuel gas and oxidizing gas are supplied to single fuel cells to improve power generation efficiency.

CITATION LIST

Patent Literature

Patent Document 1: JP2016-91968A
Patent Document 2: JP2018-139193A

SUMMARY

Problems to be Solved

Cell stacks generate heat and heat up due to power generation, but the power generation performance fluctuates depending on the operating temperature, so the temperature needs to be adjusted. For adjusting the temperature, in the pressurized system disclosed in Patent Document 1, inside the pressure vessel, convection currents circulating inside and outside the casing are formed through a passage formed in the partition wall of the casing containing the cell stacks, and the temperature of the cell stacks is adjusted by controlling the flow rate of the convection currents. In this temperature adjustment method, as the convection gas circulates inside and outside the casing, the amount of heat dissipation from inside the casing to outside the casing increases, and thus, inevitably, the amount of heat dissipation outside the pressure vessel also increases. Thus, this method has a problem of increased heat loss.

In the pressurized system disclosed in Patent Document 2, the casing containing cell stacks has sealability to suppress the amount of heat dissipation outside the pressure vessel. In this case, since the inside of the casing is sealed, the pressure in the casing tends to increase, and if the pressure increases excessively, it may cause deformation or damage to the casing.

An object of an embodiment of the present disclosure is to solve the problems of the pressurized power generation system described in Patent Documents 1 and 2. More specifically, the object is to suppress heat dissipation outside the pressure vessel and prevent deformation or damage to the casing accommodating cell stacks, while enabling adjustment of temperature of the cell stacks.

Solution to the Problems (1) A fuel cell module according to an embodiment comprises: at least one cell stack including a plurality of single fuel cells supplied with a fuel gas and an oxidizing gas to generate power; a sealable housing accommodating the at least one cell stack and forming a power generation chamber inside the housing; a pressure vessel accommodating the housing; and an oxidizing gas supply pipe for supplying the oxidizing gas to the cell stack. At least one pressure equalizing opening is formed in the housing to allow communication between inside and outside of the housing. The at least one pressure equalizing opening includes only one pressure equalizing opening, or a plurality of pressure equalizing openings in which a distance between a pressure equalizing opening in the highest position and a pressure equalizing opening in the lowest position is within 0.1H, where H is a height of the housing.

With the above configuration (1), the interior space and the exterior space of the housing are communicated through the pressure equalizing opening, which enables limited heat dissipation from inside the housing to outside the housing, thus avoiding abnormal temperature rise in the housing. Further, since the pressure equalizing opening eliminates the differential pressure between the inside and outside of the housing, excessive pressure increase in the housing is prevented. Thus, it is possible to prevent deformation or damage to the housing. Although the housing has one or a plurality of pressure equalizing openings, even with the plurality of pressure equalizing openings, since they are arranged in close proximity to each other within 0.1H in the height direction of the housing, no gas convection occurs across the inside and outside of the housing. Thus, heat release from inside the housing to outside the housing and heat release outside the pressure vessel can be suppressed, so that a reduction in the power generation efficiency of the fuel cell module due to heat loss can be suppressed.

The pressure equalizing opening in the partition wall of the housing includes a gap that inevitably occurs in the partition wall of the housing during manufacturing and allows the distribution of gas but do not form convection across the inside and outside of the housing.

(2) A fuel cell module according to an embodiment comprises: at least one cell stack including a plurality of single fuel cells supplied with a fuel gas and an oxidizing gas to generate power; a sealable housing accommodating the at least one cell stack and forming a power generation chamber inside the housing; a pressure vessel accommodating the housing; and an oxidizing gas supply pipe for supplying the oxidizing gas to the cell stack. At least one pressure equalizing opening is formed in the housing or the oxidizing gas supply pipe in the pressure vessel to allow communication between inside and outside of the housing. The at least one pressure equalizing opening includes only one pressure equalizing opening, or a first pressure equalizing opening disposed in the housing and a second pressure equalizing opening disposed in the oxidizing gas supply pipe.

The oxidizing gas is a gas that contains about 15% to 30% oxygen, typically air is suitable, but other gases can also be used, such as a mixture of combustion flue gas and air, or a mixture of oxygen and air.

With the above configuration (2), as with the above configuration (1), the at least one pressure equalizing opening disposed in the housing or the oxidant gas supply pipe avoids abnormal temperature rise in the housing and prevents deformation or damage to the housing. Further, in the case where only one pressure equalizing opening is disposed in the housing or the oxidizing gas supply pipe, no convection occurs across the inside and outside of the housing. In the case where the first pressure equalizing opening is disposed in the housing while the second pressure equalizing opening is disposed in the oxidizing gas supply pipe, since there is no differential pressure between the inside and outside of the housing, there is no gas flow through the first pressure equalizing opening, and since the pressure in the oxidizing gas supply pipe is higher than the pressure outside the housing, there is no gas flow into the oxidizing gas supply pipe from outside the housing. Thus, since no convection occurs across the inside and outside of the housing, heat release from inside the housing to outside the housing and heat release outside the pressure vessel can be suppressed, so that a reduction in the power generation efficiency of the fuel cell module due to heat loss can be suppressed.

(3) In an embodiment, in the above configuration (1) or (2), the pressure equalizing opening is disposed in an upper partition wall of the housing. The oxidizing gas supply pipe is provided from a lower portion of the housing to the inside of the housing.

With the above configuration (3), since the pressure equalizing opening and the oxidizing gas supply pipe are apart in the height direction, it is possible to prevent the oxidizing gas supplied from the oxidizing gas supply pipe into the housing from being bypassed and discharged through the pressure equalizing opening without chemical reaction in the single fuel cell.

(4) In an embodiment, in any one of the above configurations (1) to (3), a partition wall of the housing includes a breathable first insulation layer, and a sealable external plate disposed so as to partially cover the first insulation layer from the outside, and a part of the first insulation layer exposed to an outside area of the housing without being covered by the external plate functions as the pressure equalizing opening.

With the above configuration (4), since the partition wall of the housing composed of the part of the first insulation layer that is not covered by the external plate functions as the pressure equalizing opening, the formation of the pressure equalizing opening and the selection of the installation position thereof are facilitated.

(5) In an embodiment, in any one of the above configurations (1) to (4), the fuel cell module comprises: a fuel gas supply pipe for supplying the fuel gas to the cell stack; and an exhaust oxidizing gas exhaust pipe for discharging an exhaust oxidizing gas from the cell stack. The fuel cell module is configured such that an exhaust fuel gas discharged from the cell stack is discharged through the exhaust oxidizing gas exhaust pipe.

With the above configuration (5), since the exhaust oxidizing gas and the exhaust fuel gas from the cell stack can be discharged outside the housing through the single exhaust oxidizing gas exhaust pipe, the exhaust mechanism for the exhaust fuel gas and the exhaust oxidizing gas after chemical reaction can be made compact.

(6) In an embodiment, in any one of the above configurations (1) to (5), the pressure equalizing opening is disposed in an upper partition wall of the housing. The fuel cell module comprises a gas concentration sensor for detecting a concentration of a non-combusted fuel gas in an upper interior space of the pressure vessel.

When the chemical reaction does not occur in the single fuel cell due to abnormality or failure in the cell stack, unreacted fuel gas, mainly $H_2$ and CO, accumulates in the upper interior space of the pressure vessel through the pressure equalizing opening. With the above configuration (6), the occurrence of abnormality or failure in the cell stack can be detected at an early stage by detecting the non-combusted fuel gas accumulated in the upper interior space of the pressure vessel with the gas concentration sensor.

(7) In an embodiment, in any one of the above configurations (1) to (6), the fuel cell module comprises a second insulation layer disposed on an inner surface of the pressure vessel.

With the above configuration (7), since the first insulation layer is disposed on the inner surface of the pressure vessel, heat dissipation outside the pressure vessel can be further suppressed.

(8) In an embodiment, in any one of the above configurations (1) to (7), the oxidizing gas supply pipe includes: a first conduit provided with a heater; and a second conduit bypassing the heater. The pressure equalizing opening is disposed in at least one of the first conduit or the second conduit in the pressure vessel.

With the above configuration (8), since the first conduit is equipped with the heater where the oxidizing gas tends to cause pressure drop, when the fuel cell module is activated, the second conduit is used to supply the oxidizing gas to the cell stack in the housing. This allows rapid pressure rise of the oxidizing gas in the cell stack. When the cell stack should be supplied with the heated oxidizing gas, the oxidizing gas may be supplied to the cell stack through the first conduit.

(9) A power generation system according to an embodiment comprises: the fuel cell module having any one of the above configurations (1) to (8); and a rotating device configured to generate a rotational power by using an exhaust fuel gas and an exhaust oxidizing gas discharged from the fuel cell module. The fuel cell module is supplied with the oxidizing gas compressed by using the rotational power, and the fuel cell module generates power by using the fuel gas and the compressed oxidizing gas. With the above configuration (9), while achieving the object of the present disclosure, the power generation efficiency can be improved by supplying compressed oxidizing gas to the fuel cell module, and the power required for the power generation system can be reduced by generating the rotational power using the exhaust fuel gas and the exhaust oxidizing gas from the fuel cell module.

(10) In an embodiment, in the above configuration (9), the rotating device comprises a gas turbine or a turbocharger.

With the above configuration (10), in addition to improving the power generation efficiency and reducing the power required for the power generation system, since the rotating device is a gas turbine, combined power generation can be achieved with the fuel cell module and the gas turbine.

Advantageous Effects

According to some embodiments, while enabling adjustment of temperature of the cell stacks, heat loss is suppressed to improve the power generation performance, and excessive pressure increase in the casing accommodating the cell stacks is suppressed to prevent deformation or damage to the casing,

DETAILED DESCRIPTION

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

FIGS. 1 to 4 show a fuel cell module 10 (10A, 10B, 10C, 10D) according to some embodiments. The fuel cell module 10 has at least one cell stack 14 (14a, 14b) inside a sealable housing 12 (12a, 12b). The cell stack 14 includes a plurality of single fuel cells. The single fuel cells are supplied with a fuel gas and an oxidizing gas to generate power through chemical reaction using these gas as raw materials, forming a power generation chamber G in the housing 12. The housing 12 is accommodated in a pressure vessel 16 with a sealed structure. A fuel gas supply pipe 18 for supplying the fuel gas f to the single fuel cells and an oxidizing gas supply pipe 20 for supplying the oxidizing gas a to the single fuel cells are connected to the housing 12 from the outside of the pressure vessel 16 through the partition wall of the pressure vessel 16. The exhaust fuel gas f' after chemical reaction in the single fuel cells is discharged outside the pressure vessel 16 through an exhaust fuel gas exhaust pipe 22, and the exhaust oxidizing gas a' after chemical reaction in the single fuel cells is discharged outside the pressure vessel 16 through an exhaust oxidizing gas exhaust pipe 24.

In some embodiments, at least one pressure equalizing opening 26 is disposed in at least one of the partition wall of the housing 12 or the oxidizing gas supply pipe 20.

Figure 1:
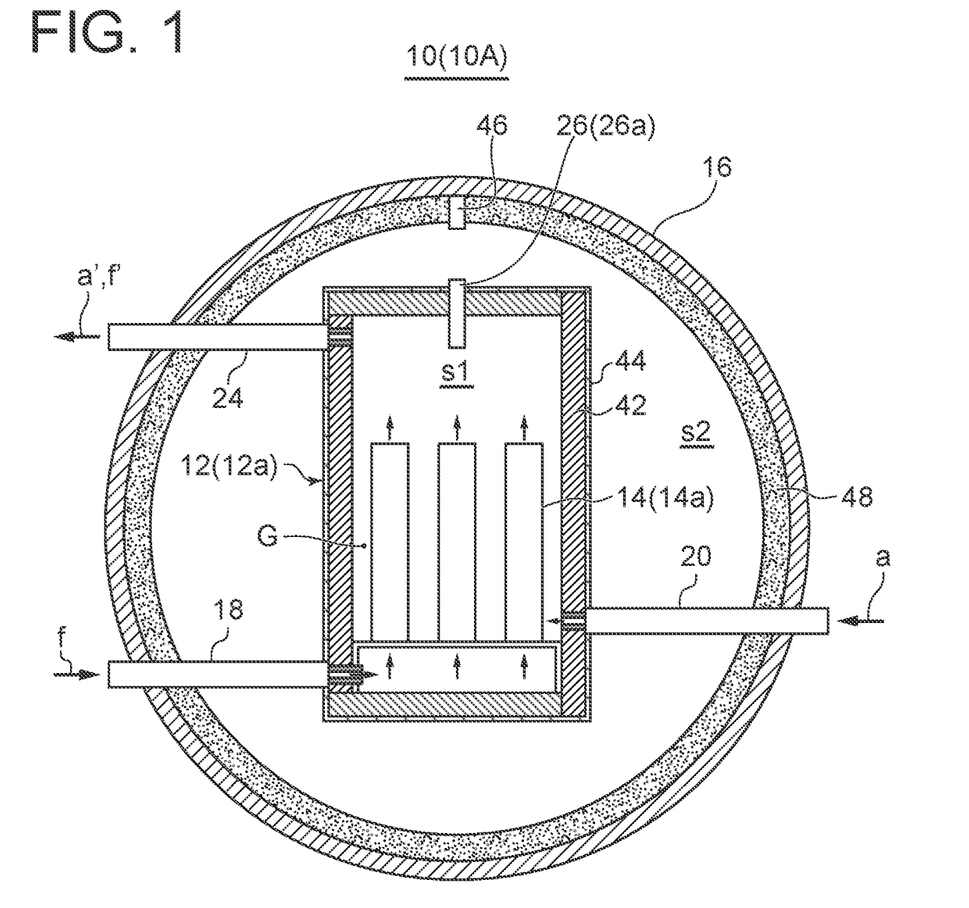
FIG. 1 is a cross-sectional view of a fuel cell module according to an embodiment.

In the embodiment shown in FIG. 1, only one pressure equalizing opening 26 (26a) is disposed in the partition wall of the housing 12. In the embodiment shown in FIG. 2, a plurality of pressure equalizing openings 26 (26b, 26c) are disposed in the partition wall of the housing 12. In this embodiment, a distance $H_1$ between the pressure equalizing opening 26 (26b) in the highest position and the pressure equalizing opening 26 (26c) in the lowest position is in a range of $H_1 \leq 0.1H$, where H is the height of the housing 12. In the embodiment shown in FIG. 3, only one pressure equalizing opening 26 (26d) is disposed in the oxidizing gas supply pipe 20. In the embodiment shown in FIG. 4, one pressure equalizing opening 26 (26a) (first pressure equalizing opening) is disposed in the housing 12, and one pressure equalizing opening 26 (26e) (second pressure equalizing opening) is disposed in the oxidizing gas supply pipe 20.

Figure 2:
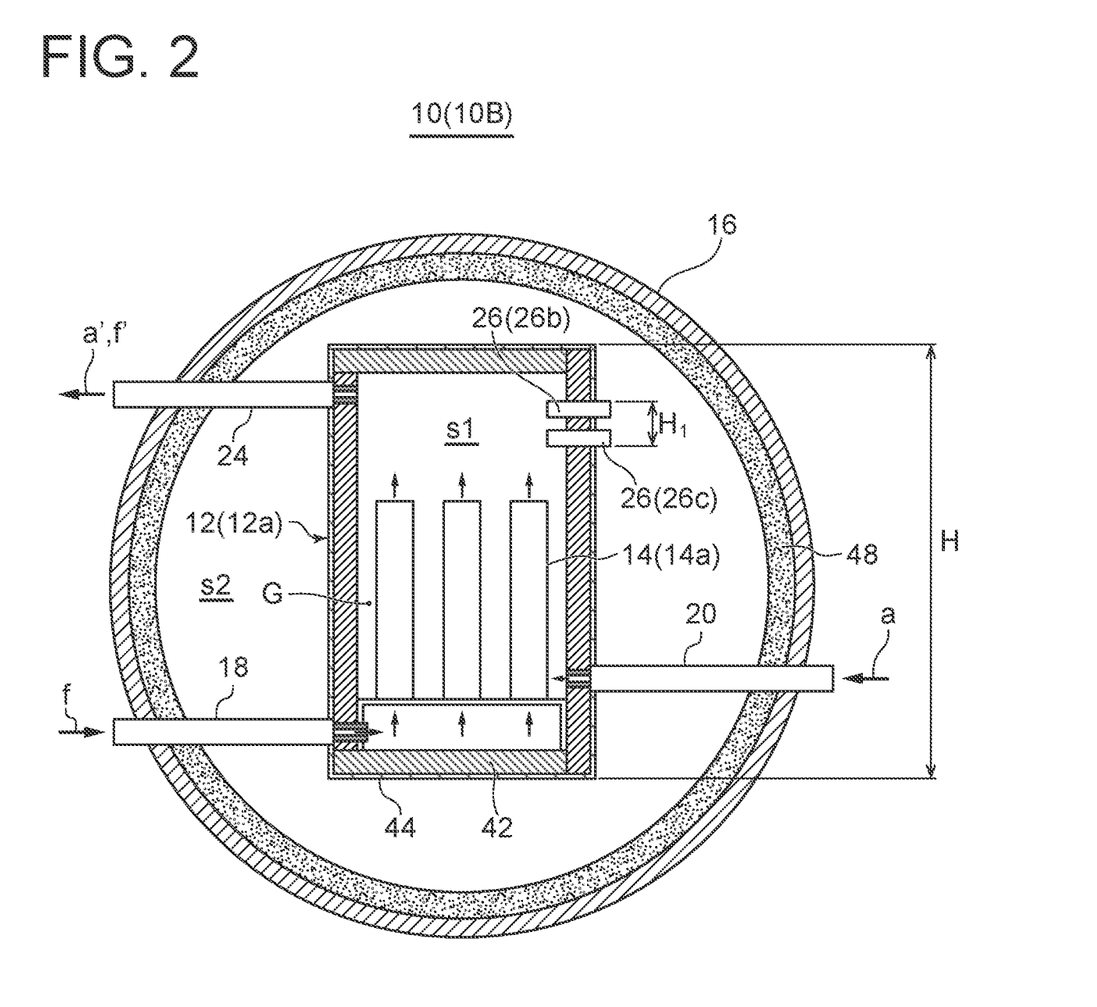
FIG. 2 is a cross-sectional view of a fuel cell module according to an embodiment.
Figure 4:
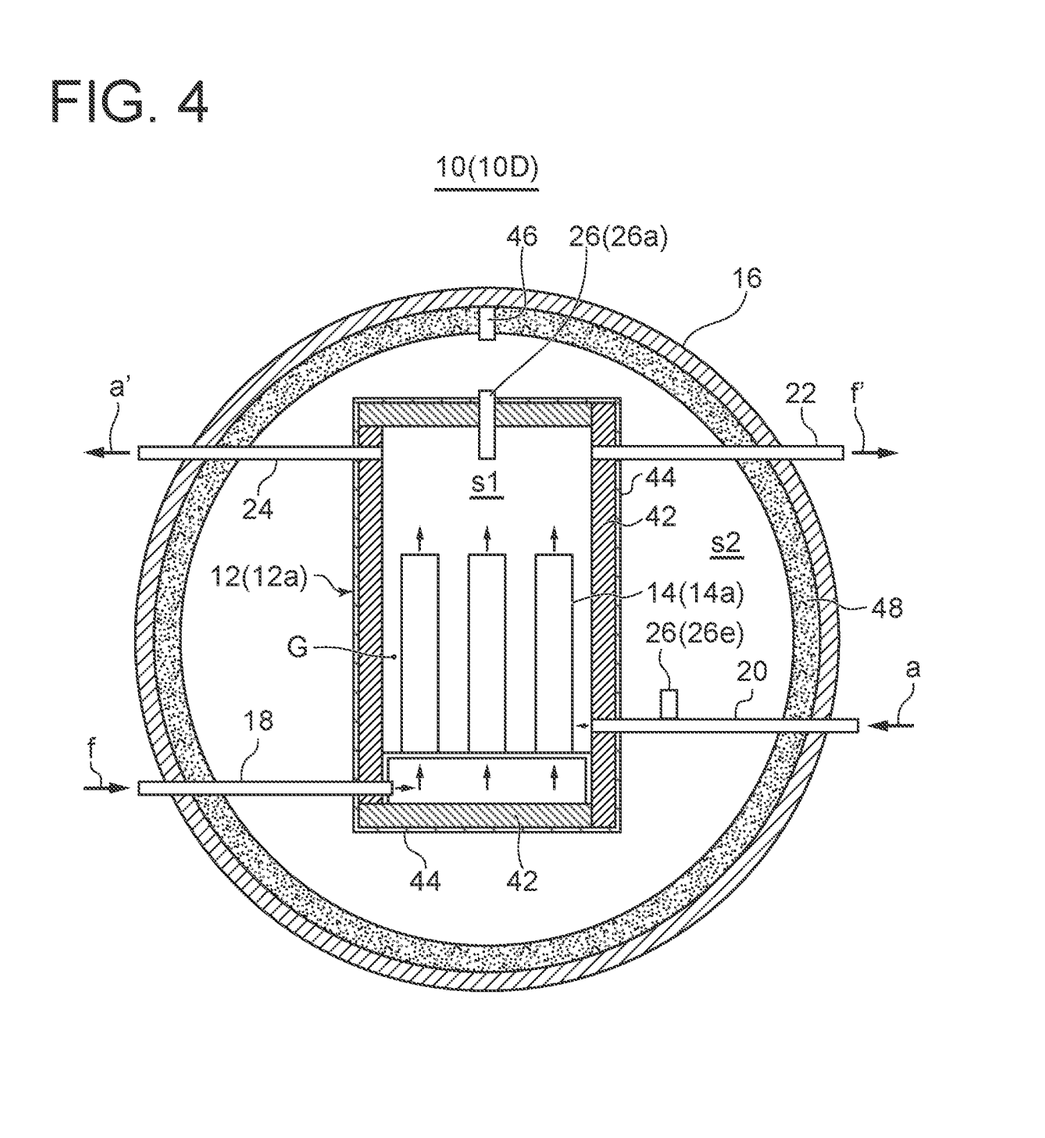
FIG. 4 is a cross-sectional view of a fuel cell module according to an embodiment.

According to the above-described embodiments, the interior space s1 and the exterior space s2 of the housing 12 are communicated through the pressure equalizing opening 26, which enables limited heat dissipation from inside the housing to outside the housing. This avoids abnormal temperature rise in the housing. Further, the pressure equalizing opening 26 eliminates the differential pressure between the inside and outside of the housing. This prevents excessive pressure increase in the housing 12 and thus prevents deformation or damage to the housing 12. Moreover, in the case where only one pressure equalizing opening 26 is disposed, no convection occurs across the inside and outside of the housing 12. In the case where a plurality of pressure equalizing openings 26 are disposed, for example as shown in FIG. 2, when the distance $H_1$ between the pressure equalizing opening 26 (26b) in the highest position and the pressure equalizing opening 26 (26c) in the lowest position relative to the height H of the housing 12 is in a range of $H_1 \leq 0.1H$, no convection occurs across the inside and outside of the housing 12. Further, as shown in FIG. 4, when the pressure equalizing opening 26 (26a, 26e) is disposed in each of the partition wall of the housing 12 and the oxidizing gas supply pipe 20, since the pressure in the oxidizing gas supply pipe 20 is higher than the exterior space s2, there is no gas flow into the oxidizing gas supply pipe 20 from the exterior space s2. Accordingly, no convection occurs across the inside and outside of the housing 12. Therefore, heat release from inside the housing 12 to outside the housing 12 and heat release outside the pressure vessel 16 can be suppressed, and heat loss of the fuel cell module 10 can be suppressed, so that a reduction in the power generation efficiency can be suppressed.

In the case where a plurality of pressure equalizing openings are disposed in the partition wall of the housing 12, as the condition for preventing convection across the inside and outside of the housing through the pressure equalizing openings 26, in an embodiment, the positional condition in the height direction of the pressure equalizing openings 26 is set as described above. This is because convection is assumed to occur due to the temperature difference between the inside and outside of the housing in the height direction, resulting in flow along the height direction. On the other hand, if the pressure equalizing openings are located at the same height but apart from each other in plan view, convection may occur. Therefore, it is desirable to form the openings close to each other in plan view. Specifically, it is desirable to set W≤0.1H, where W is the farthest distance between the pressure equalizing openings in plan view.

Figure 5:
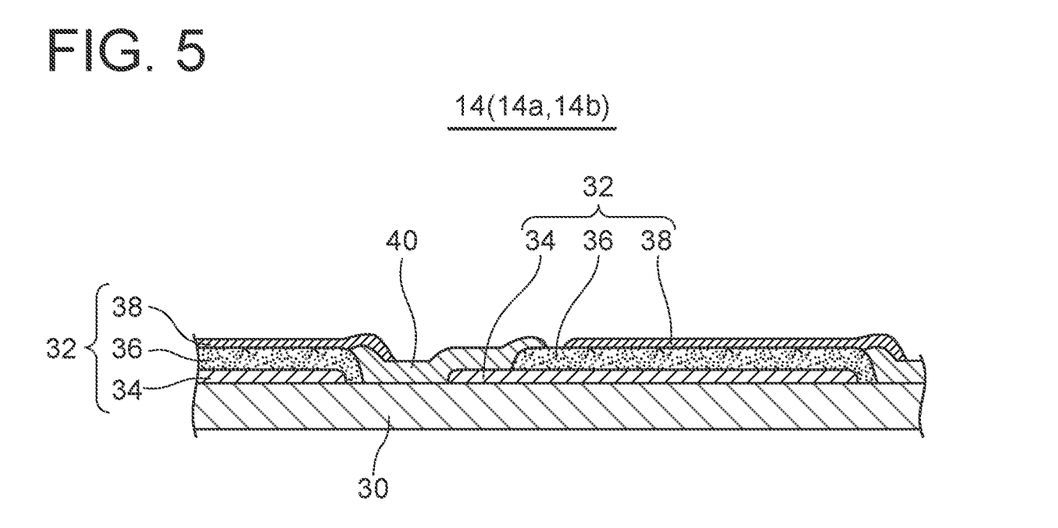
FIG. 5 is a cross-sectional view of a cell stack according to an embodiment.

FIG. 5 is a cross-sectional view of the cell stack 14 according to an embodiment. In FIG. 5, the cell stack 14 includes a substrate 30, a plurality of single fuel cells 32 formed on the surface of the substrate 30, and an interconnector 40 formed between adjacent single fuel cells 32. The single fuel cell 32 includes a fuel side electrode 34, an electrolyte 36, and an oxygen side electrode 38 laminated on the surface of the substrate 30 in this order. The interconnector 40 is electrically conductive and electrically connects the fuel side electrode 34 and the oxygen side electrode 38 of adjacent single fuel cells 32 to connect the adjacent single fuel cells in series. Thus, the DC power generated by the single fuel cells 32 arranged in series is extracted by the interconnector 40 to the end of the substrate 30.

The cell stack 14 can be classified by the shape of the substrate 30 into a cylindrical type and a flat type. In the cylindrical cell stack, the substrate 30 is composed of a cylindrical substrate tube in which the fuel gas f flows, while in the flat cell stack, the substrate 30 has a flat plate shape. The embodiments shown in FIGS. 1, 2, and 4 include the cylindrical cell stack 14 (14a), while the embodiment shown in FIG. 3 includes the flat cell stack 14 (14b).

In an embodiment, as shown in FIG. 1, the pressure equalizing opening 26 (26a) is disposed in the upper partition wall of the housing 12, while the oxidizing gas supply pipe 20 is provided from the lower portion of the housing 12 to the inside of the housing 12. According to this embodiment, since the pressure equalizing opening 26 (26a) and the oxidizing gas supply pipe 20 are apart from each other, it is possible to prevent the oxidizing gas a supplied from the oxidizing gas supply pipe 20 into the housing 12 from being bypassed and discharged through the pressure equalizing opening 26 (26a) to the outside of the housing 12 without chemical reaction in the single fuel cell 32.

In some embodiments, as shown in FIGS. 1, 2, and 4, the partition wall of the housing 12 includes a breathable insulation layer 42 (first insulation layer), and a sealable external plate 44 disposed so as to partially cover the insulation layer 42 from the outside. Further, for the pressure equalizing opening 26 (26a to 26c), a part of the insulation layer 42 exposed to the outside area of the housing 12 in the interior space of the pressure vessel 16 without being covered by the external plate 44 functions as the pressure equalizing opening. The insulation layer 42 is composed of a breathable heat insulation material. According to this embodiment, since the pressure equalizing opening 26 can be configured by simply removing the external plate 44 from the partition wall of the housing 12, which is composed of the insulation layer 42 and the external plate 44, the formation of the pressure equalizing opening 26 and the selection of the installation position thereof are facilitated.

In an embodiment, as shown in FIGS. 1 and 2, the exhaust fuel gas exhaust pipe 22 is eliminated, and the exhaust fuel gas f' from the cell stack 14 (14a) is discharged through the exhaust oxidizing gas exhaust pipe 24. According to this embodiment, since the exhaust oxidizing gas a' and the exhaust fuel gas f' from the cell stack 14 can be discharged outside the housing 12 and the pressure vessel 16 through the single exhaust oxidizing gas exhaust pipe 24, the exhaust mechanism for the exhaust fuel gas f' and the exhaust oxidizing gas a' can be made compact.

In an embodiment, as shown in FIGS. 1 and 4, the pressure equalizing opening 26 (26a) is disposed in the upper partition wall of the housing 12, and a gas concentration sensor 46 is disposed on the upper inner surface of the pressure vessel 16. The gas concentration sensor 46 is configured to detect the concentration of unreacted fuel gas f accumulated in the upper interior space of the pressure vessel 16. When the chemical reaction does not occur in the single fuel cell 32 due to abnormality or failure in the cell stack 14, unreacted fuel gas f, mainly $H_2$ and CO, accumulates in the upper interior space of the pressure vessel 16 through the pressure equalizing opening 26 (26a). The gas concentration sensor 46 detects the unreacted fuel gas f accumulated in the upper interior space and, if the concentration of the unreacted fuel gas f exceeds a threshold, it is determined that abnormality or failure occurs in the cell stack 14. Thus, the occurrence of abnormality or failure in the cell stack 14 (14a) can be detected at an early stage.

In some embodiments, as shown in FIGS. 1 to 4, the fuel cell module includes an insulation layer 48 (second insulation layer) on the inner surface of the pressure vessel 16. According to this embodiment, since the insulation layer 42 is disposed on the inner surface of the pressure vessel 16, heat dissipation outside the pressure vessel can be further suppressed. Thus, since heat loss of the fuel cell module 10 can be further suppressed, a reduction in the power generation efficiency of the fuel cell module 10 can be suppressed.

Figure 3:
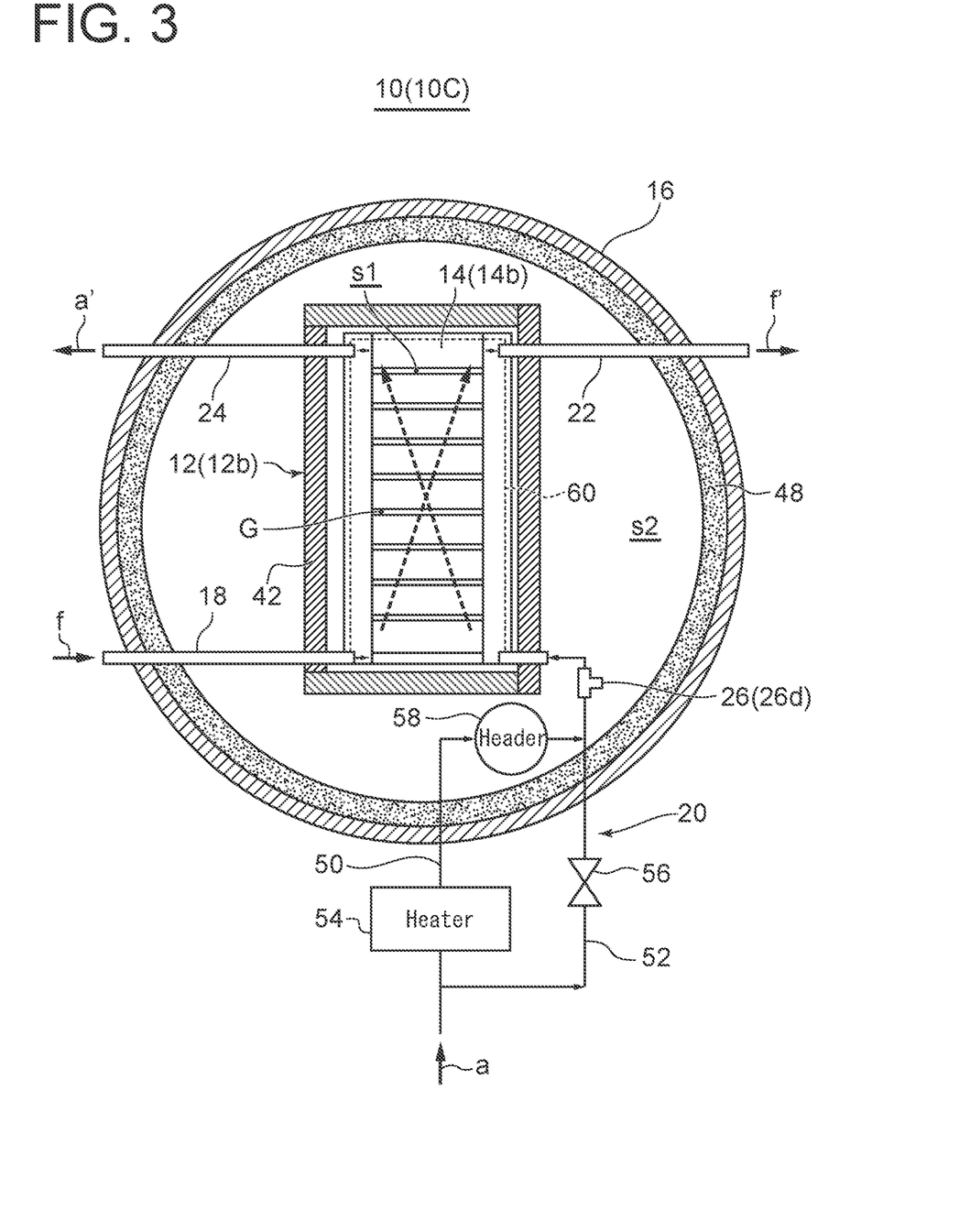
FIG. 3 is a cross-sectional view of a fuel cell module according to an embodiment.

In an embodiment, as shown in FIG. 3, the oxidizing gas supply pipe 20 includes a conduit 50 (first conduit) provided with a heater 54, and a conduit 52 (second conduit) bypassing the heater 54 disposed on the conduit 50. The pressure equalizing opening 26 (26d) is disposed in at least one of the conduit 50 or the conduit 52 in the pressure vessel 16. According to this embodiment, since the conduit 50 is equipped with the heater 54 where the oxidizing gas a tends to cause pressure drop while flowing through the meandering internal pipe, when the fuel cell module 10 (10C) is activated, the conduit 52 is used to supply the oxidizing gas a to the cell stack 14 (14b) in the housing 12. This allows rapid pressure rise of the oxidizing gas a in the cell stack 14 (14b), which in turn allows rapid startup. Further, when the cell stack 14 (14b) should be supplied with the heated oxidizing gas a, the oxidizing gas a may be supplied to the heater 54 through the conduit 50 and heated by the heater 54.

In the embodiment shown in FIG. 3, a valve 56 is disposed in the conduit 52. By opening and closing the valve 56, it is possible to select whether the passage of the oxidizing gas supply pipe 20 is used to supply all of the oxidizing gas a from the conduit 50 to the cell stack 14 (14b) or to pass a part of the oxidizing gas a through the conduit 52. Further, the conduit 50 includes a header 58. Although the oxidizing gas a in the conduit 50 becomes turbulent downstream after passing through the heater 54, the turbulent oxidizing gas a can be temporarily stored in the header 58 to eliminate the turbulent flow condition.

In the embodiment shown in FIG. 3, the cell stack 14 (14b) accommodated in the housing 12 (12b) has a flat plate shape. The housing 12 (12b) has, instead of the external plate 44 used in other embodiments, a sealed structure that seals the inside of the housing 12 (12b) with a seal line 60 disposed inside the insulation layer 42. In other embodiments, a plurality of cell stacks 14 (14b) accommodated in the housing 12 (12b) may each have a sealed structure, or may have a housing with a sealed structure.

The Fuel cell module including the SOFC may be applied to a combined cycle power generation system used in combination with a gas turbine combined cycle (GTCC), a micro gas turbine (MGT), or a turbocharger.

Figure 6:
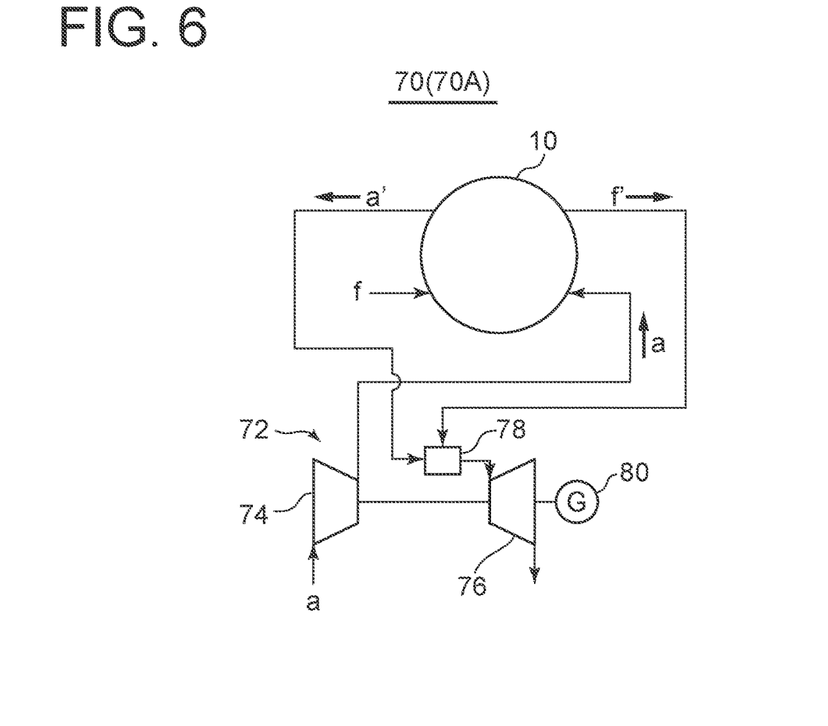
FIG. 6 is a system diagram of a power generation system according to an embodiment.

FIG. 6 is a system diagram of a power generation system 70 (70A) according to an embodiment. In FIG. 6, the power generation system 70 (70A) includes the fuel cell module 10 according to some embodiment with the above configuration, and a gas turbine 72 (rotating device). The oxidizing gas a is supplied to a compressor 74 constituting the gas turbine 72. After being compressed by the compressor 74, the oxidizing gas a is supplied to the fuel cell module 10 through the oxidizing gas supply pipe 20. The exhaust oxidizing gas a' and the exhaust fuel gas f' used in chemical reaction for power generation in the fuel cell module 10 are supplied to a combustor 78 constituting the gas turbine 72 through the exhaust fuel gas exhaust pipe 22 and the exhaust oxidizing gas exhaust pipe 24 to produce a hot combustion gas in the combustor 78. The rotational power generated by the adiabatic expansion of this combustion gas in a turbine 76 generates power in a power generator 80, and also drives the compressor 74 to generate a compressed gas. This compressed gas is supplied as the oxidizing gas a to the oxidizing gas supply pipe 20 of the fuel cell module 10. The fuel cell module 10 generates power using the compressed oxidizing gas a and fuel gas f.

In this embodiment, for example, the fuel cell module 10 (10C, 10D) shown in FIGS. 3 and 4 is used.

With the above configuration, the fuel cell module 10 according to the above-described embodiments suppresses excessive temperature rise and pressure rise in the housing 12 and also suppresses heat dissipation outside the pressure vessel 16 to suppress a reduction in the power generation efficiency. Further, since the compressed oxidizing gas a can be supplied to the fuel cell module 10, the power generation efficiency can be improved. Further, since the combustor 78 is driven by the exhaust oxidizing gas a' and the exhaust fuel gas f' discharged from the fuel cell module 10 to generate a rotational power, the required power of the power generation system 70 (70A) can be reduced. Furthermore, since both the fuel cell module 10 and the gas turbine 72 can generate power in a combined manner, the power generation amount can be increased.

Figure 7:
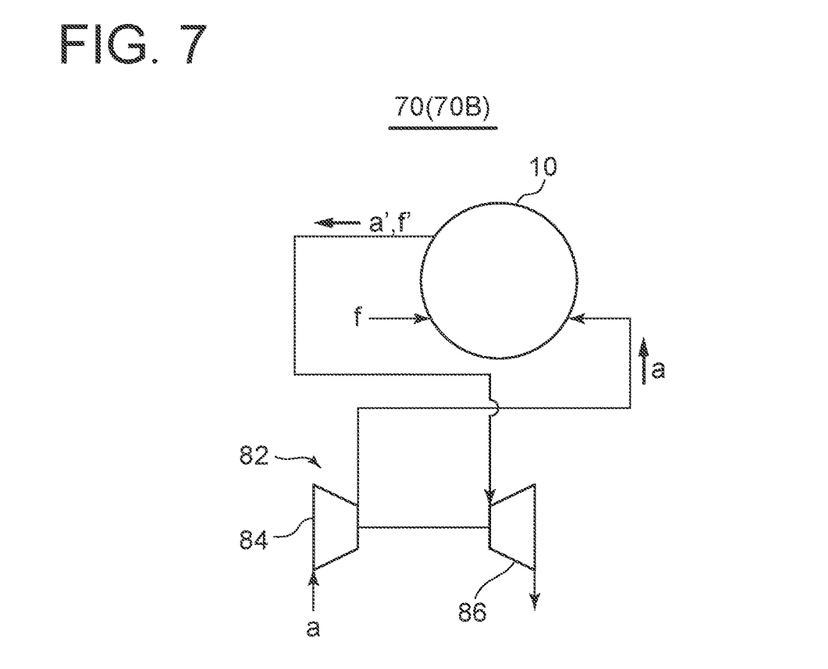
FIG. 7 is a system diagram of a power generation system according to an embodiment.

FIG. 7 is a system diagram of a power generation system 70 (70B) according to an embodiment. In the power generation system 70 (70B), a turbocharger 82 is used as the rotating device. In FIG. 7, the oxidizing gas a is supplied to a compressor 84 constituting the turbocharger 82 to compress the oxidizing gas, and the compressed oxidizing gas a is supplied to the fuel cell module 10. The exhaust oxidizing gas a' and the exhaust fuel gas f used in chemical reaction for power generation in the fuel cell module 10 are supplied to a turbine 86 constituting the turbocharger 82 through the exhaust fuel gas exhaust pipe 22 and the exhaust oxidizing gas exhaust pipe 24 and rotates the turbine 86 to generate a rotational power. This rotational power drives the compressor 84 to generate a compressed gas. In this embodiment, for example, the fuel cell module 10 (10A, 10B) shown in FIGS. 1 and 2, in which the exhaust oxidizing gas exhaust pipe 24 serves to discharge both the exhaust fuel gas f' and the exhaust oxidizing gas a', is used.

According to this embodiment, the power generation efficiency of the power generation system 70 (70B) can be improved, and the required power can be reduced.

INDUSTRIAL APPLICABILITY

According to some embodiments, while enabling adjustment of temperature of the cell stacks, heat dissipation to the pressure vessel is suppressed to improve the power generation performance, and excessive pressure increase in the casing accommodating the cell stacks is suppressed to prevent deformation or damage to the casing,

REFERENCE SIGNS LIST 10 (10A, 10B, 10C, 10D) Fuel cell module
12 (12a, 12b) Housing
14 (14a, 14b) Cell stack
16 Pressure vessel
18 Fuel gas supply pipe
20 Oxidizing gas supply pipe
22 Exhaust fuel gas exhaust pipe
24 Exhaust oxidizing gas exhaust pipe
26 (26a, 26b, 26c, 26d, 26e) Pressure equalizing opening
30 Substrate
32 Single fuel cell
34 Fuel side electrode
36 Electrolyte
38 Oxygen side electrode
40 Interconnector
42 Insulation layer (First insulation layer)
44 External plate
46 Gas concentration sensor
48 Insulation layer (Second insulation layer)
50 Conduit (First conduit)
52 Conduit (Second conduit)
54 Heater
56 Valve
58 Header
60 Seal line
70 (70S, 70B) Power generation system
72 Gas turbine
74, 84 Compressor
76, 86 Turbine
82 Turbocharger
78 Combustor
80 Power generator
G Power generation chamber
a Oxidizing gas
a' Exhaust oxidizing gas
f Fuel gas
f' Exhaust fuel gas

The invention claimed is:

1. A fuel cell module, comprising:
at least one cell stack including a plurality of single fuel cells supplied with a fuel gas and an oxidizing gas to generate power;
a sealable housing accommodating the at least one cell stack and forming a power generation chamber inside the housing;
a pressure vessel accommodating the housing; and an oxidizing gas supply pipe for supplying the oxidizing gas to the cell stack, wherein at least one pressure equalizing opening is formed in the housing to allow communication between inside and outside of the housing, and wherein the at least one pressure equalizing opening includes only one pressure equalizing opening, or a plurality of pressure equalizing openings in which a distance between a pressure equalizing opening in the highest position and a pressure equalizing opening in the lowest position is within 0.1H, where H is a height of the housing.

2. A fuel cell module, comprising:

at least one cell stack including a plurality of single fuel cells supplied with a fuel gas and an oxidizing gas to generate power;

a sealable housing accommodating the at least one cell stack and forming a power generation chamber inside the housing;

a pressure vessel accommodating the housing; and an oxidizing gas supply pipe for supplying the oxidizing gas to the cell stack, wherein at least one pressure equalizing opening is formed in the housing or the oxidizing gas supply pipe in the pressure vessel to allow communication between inside and outside of the housing, and wherein the at least one pressure equalizing opening includes only one pressure equalizing opening, or a first pressure equalizing opening disposed in the housing and a second pressure equalizing opening disposed in the oxidizing gas supply pipe.

3. The fuel cell module according to claim 1, wherein the pressure equalizing opening is disposed in an upper partition wall of the housing, and wherein the oxidizing gas supply pipe is provided from a lower portion of the housing to the inside of the housing.

4. The fuel cell module according to claim 1, wherein a partition wall of the housing includes a breathable first insulation layer, and a sealable external plate disposed so as to partially cover the first insulation layer from the outside, and wherein a part of the first insulation layer exposed to an outside area of the housing without being covered by the external plate functions as the pressure equalizing opening.

5. The fuel cell module according to claim 1, comprising:

a fuel gas supply pipe for supplying the fuel gas to the cell stack; and an exhaust oxidizing gas exhaust pipe for discharging an exhaust oxidizing gas from the cell stack, wherein the fuel cell module is configured such that an exhaust fuel gas discharged from the cell stack is discharged through the exhaust oxidizing gas exhaust pipe.

6. The fuel cell module according to claim 1, wherein the pressure equalizing opening is disposed in an upper partition wall of the housing, and wherein the fuel cell module comprises a gas concentration sensor for detecting a concentration of a non-combusted fuel gas in an upper interior space of the pressure vessel.

7. The fuel cell module according to claim 1, comprising a second insulation layer disposed on an inner surface of the pressure vessel.

8. The fuel cell module according to claim 1, wherein the oxidizing gas supply pipe includes:

a first conduit provided with a heater; and a second conduit bypassing the heater, and wherein the pressure equalizing opening is disposed in at least one of the first conduit or the second conduit in the pressure vessel.

9. A power generation system, comprising:

the fuel cell module according to claim 1; and a rotating device configured to generate a rotational power by using an exhaust fuel gas and an exhaust oxidizing gas discharged from the fuel cell module, wherein the fuel cell module is supplied with the oxidizing gas compressed by using the rotational power, and the fuel cell module generates power by using the fuel gas and the compressed oxidizing gas.

10. The power generation system according to claim 9, wherein the rotating device comprises a gas turbine or a turbocharger.

11. The fuel cell module according to claim 2, wherein the pressure equalizing opening is disposed in an upper partition wall of the housing, and wherein the oxidizing gas supply pipe is provided from a lower portion of the housing to the inside of the housing.

12. The fuel cell module according to claim 2, wherein a partition wall of the housing includes a breathable first insulation layer, and a sealable external plate disposed so as to partially cover the first insulation layer from the outside, and wherein a part of the first insulation layer exposed to an outside area of the housing without being covered by the external plate functions as the pressure equalizing opening.

13. The fuel cell module according to claim 2, comprising:

a fuel gas supply pipe for supplying the fuel gas to the cell stack; and an exhaust oxidizing gas exhaust pipe for discharging an exhaust oxidizing gas from the cell stack, wherein the fuel cell module is configured such that an exhaust fuel gas discharged from the cell stack is discharged through the exhaust oxidizing gas exhaust pipe.

14. The fuel cell module according to claim 2, wherein the pressure equalizing opening is disposed in an upper partition wall of the housing, and wherein the fuel cell module comprises a gas concentration sensor for detecting a concentration of a non-combusted fuel gas in an upper interior space of the pressure vessel.

15. The fuel cell module according to claim 2, comprising a second insulation layer disposed on an inner surface of the pressure vessel.

16. The fuel cell module according to claim 2, wherein the oxidizing gas supply pipe includes:

a first conduit provided with a heater; and a second conduit bypassing the heater, and wherein the pressure equalizing opening is disposed in at least one of the first conduit or the second conduit in the pressure vessel.

17. A power generation system, comprising:

the fuel cell module according to claim 2; and a rotating device configured to generate a rotational power by using an exhaust fuel gas and an exhaust oxidizing gas discharged from the fuel cell module, wherein the fuel cell module is supplied with the oxidizing gas compressed by using the rotational power, and the fuel cell module generates power by using the fuel gas and the compressed oxidizing gas.

18. The power generation system according to claim 17, wherein the rotating device comprises a gas turbine or a turbocharger.

* * * * *